(12) United States Patent
Mani

(10) Patent No.: US 8,769,535 B2
(45) Date of Patent: Jul. 1, 2014

(54) PROVIDING VIRTUAL MACHINE HIGH-AVAILABILITY AND FAULT TOLERANCE VIA SOLID-STATE BACKUP DRIVES

(75) Inventor: Mahalingam Mani, Cupertino, CA (US)

(73) Assignee: Avaya Inc., Basking Ridge, NJ (US)

( * ) Notice: Subject to any disclaimer, the term of this patent is extended or adjusted under 35 U.S.C. 154(b) by 716 days.

(21) Appl. No.: 12/566,234

(22) Filed: Sep. 24, 2009

(65) Prior Publication Data

US 2011/0072430 A1    Mar. 24, 2011

(51) Int. Cl.
*G06F 11/00* (2006.01)
*G06F 11/07* (2006.01)
*G06F 11/20* (2006.01)
*G06F 9/455* (2006.01)

(52) U.S. Cl.
USPC ............... 718/100; 718/1; 711/161; 711/162; 714/2; 714/15

(58) Field of Classification Search
CPC ....................... G06F 11/2023; G06F 2201/815
See application file for complete search history.

(56) References Cited

U.S. PATENT DOCUMENTS

| | | | | |
|---|---|---|---|---|
| 6,223,202 B1* | 4/2001 | Bayeh | ............................ | 718/102 |
| 6,538,344 B1* | 3/2003 | Yang et al. | ......................... | 307/66 |
| 7,058,835 B1* | 6/2006 | Sullivan et al. | ............... | 713/324 |
| 7,292,567 B2 | 11/2007 | Terrell et al. | | |
| 7,533,229 B1* | 5/2009 | van Rietschote | ............. | 711/161 |
| 2002/0083110 A1* | 6/2002 | Kozuch et al. | ..................... | 709/1 |
| 2003/0126388 A1 | 7/2003 | Yamagami | | |
| 2003/0126494 A1* | 7/2003 | Strasser | ............................. | 714/6 |
| 2005/0097308 A1* | 5/2005 | Holzmann | ......................... | 713/1 |
| 2005/0132250 A1* | 6/2005 | Hansen et al. | ..................... | 714/5 |
| 2006/0248036 A1 | 11/2006 | Stanev et al. | | |
| 2006/0260335 A1* | 11/2006 | Montuoro et al. | .............. | 62/236 |
| 2008/0222375 A1* | 9/2008 | Kotsovinos et al. | .......... | 711/162 |
| 2009/0119538 A1* | 5/2009 | Scales et al. | ..................... | 714/6 |
| 2009/0210455 A1* | 8/2009 | Sarkar et al. | .................. | 707/201 |
| 2009/0210620 A1* | 8/2009 | Jibbe et al. | ..................... | 711/114 |
| 2009/0222498 A1 | 9/2009 | Lu et al. | | |
| 2009/0313447 A1* | 12/2009 | Nguyen et al. | ................ | 711/162 |
| 2011/0022574 A1* | 1/2011 | Hansen | ........................... | 707/698 |

FOREIGN PATENT DOCUMENTS

JP    2007-115050    5/2007
WO    WO 2009/110144    9/2009

OTHER PUBLICATIONS

Fusion-io; Fusion-io's Solid State Storage—a New Standard for Enterprise-Class Reliability; 7 pages.
Fusion-io; Spec sheet for ioDrive Duo; 2 pages.
Fusion-io; Taming the Power Hungry Data Center; 15 pages.
Saini et al.; Enhancing applications performance on Intel Paragon through dynamicmemory allocation; IEEE XPlore Digital Library; printed Aug. 20, 2009 from http://ieeexplore.ieee.org/Xplore/login.jsp?url+http%3A%2F%2Fieeexplore.ieee.org%2Fiel2%2F2953%F8381%F00365561 . . . ; 2 pages.
Chapter 3—A Basic Virtualized Enterprise; html version of the file http://media.techtarget.com/searchNetworking/downloads/virtualized_enterprise.pdf; 33 pages.

(Continued)

*Primary Examiner* — Meng An
*Assistant Examiner* — Benjamin Wu
(74) *Attorney, Agent, or Firm* — Sheridan Ross P.C.

(57) ABSTRACT

The present invention is directed to a virtualization system using a solid-state drive for disaster recovery.

9 Claims, 4 Drawing Sheets

(56) References Cited

OTHER PUBLICATIONS

Day; Embedded OS—How software virtualization works in embedded; EE Times-Asia (eetasia.com); 2 pages.
Virtualization Technologies and their Impact on Disaster Recovery Planning; Double-Take Software; Dynamic Infrastructure Optimization; Mar. 2009; 11 pages.
Cully et al.; Remus: High Availability via Asynchronous Virtual Machine Replication; Department of Computer Sciente, The University of British Columbia; 24 pages.
Wikipedia; Solid-state drive; printed on Aug. 20, 2009 from http://en.wikipedia.org/wiki/Solid-state_drive; 13 pages.
Wikipedia; File System; printed on Aug. 20, 2009 from http://en.wikipedia.org/wiki/File_system; 13 pages.
Wikipedia; Hypervisor; printed on Sep. 8, 2009 from http://en.wikipedia.org/wiki/Hypervisor; 7 pages.
Wikipedia; Virtual machine; printed on Aug. 20, 2009 from http://en.wikipedia/org/wiki/Virtual_machine; 10 pages.
Paragon Software Group; Drive Backup 9.0 Enterprise Server; printed on Aug. 21, 2009 from http://www.paragon-software.com/business/db-ese/; 4 pages.
Paragon Software Group; Drive Backup 9.0 Server; printed on Aug. 21, 2009 from http://paragon-software.com/business/db-server/; 4 pages.
Paragon Software Group; Drive Backup 0.9 Server; printed on Aug. 21, 2009 fromhttp://www.paragon-software.com/business/db-server/features.html; 4 pages.
Paragon Software Group; Drive Backup 9.0 Server Technician License; printed on Aug. 21, 2009 from http://www.paragon-software.com/business/db-server-tl/; 2 pages.
Paragon Software Group; Drive Backup 9.0 Server Technician License; printed on Aug. 21, 2009 from http://www.paragon-software.com/business/db-server-tl/addon-recovery.html; 2 pages.
Paragon Software Group; Paragon Drive Backup; printed on Aug. 21, 2009 from http://www.paragon-software.com/business/solutions/system_and_data_protection/db_itsp; 2 pages.
Paragon Software Group; Paragon Adaptive Imaging Tools; printed on Aug. 21, 2009 from http://www.paragon-software.com/business/adaptiveimagingtools/; 3 pages.
Paragon Software Group; Hard Disk Manager 2009 Server Technician License; printed on Aug. 21, 2009 from http://www.paragon-software.com/business/hdm-server-tl/; 2 pages.
Paragon Software Group; Paragon Snapshot Technologies; printed on Aug. 21, 2009 from http://www.paragon-software.comtechnologies/snapshot.html; 6 pages.
Paragon Software Group; Paragon Universal File System Drivers; printed on Aug. 21, 2009 from http://www.paragon-software.com/technologies/ufsd.html; 3 pages.
Extended European Search Report for European Patent Application No. 10178232.4, dated Mar. 2, 2011.
Official Action for European Patent Application No. 10178232.4, dated Oct. 31, 2011 10 pages.
Notice of Allowance for European Patent Application No. 10178232.4, dated Jun. 22, 2012 32 pages.
Official Action with English Translation for China Patent Application No. 201010294221.6, dated Oct. 30, 2013 13 pages.
Official Action with English Translation for Japan Patent Application No. 2010-210466, mailed Oct. 1, 2013 6 pages.

\* cited by examiner

PROVIDING VIRTUAL MACHINE HIGH-AVAILABILITY AND FAULT TOLERANCE VIA SOLID-STATE BACKUP DRIVES

FIELD

The invention relates generally to high availability and virtualization systems and particularly to memory mirrored virtualization systems.

BACKGROUND

Solid-state drives ("SSDs") are yet another step towards greener stable-storage technologies. SSDs are data storage devices using solid-state memory to store persistent data. An SSD emulates a hard disk drive interface, thereby making an SSD a replacement for a hard disk drive interface. An SSD using flash memory is known as a flash drive. An SSD using SRAM or DRAM (instead of flash memory) is often called a random access memory ("RAM")-drive. Dynamic random access memory ("DRAM")-based SSDs usually incorporate either an internal battery or an external AC/DC adapter and backup storage systems to ensure data persistence while no power is being supplied to the drive from an external source. If power is lost, the battery provides power while all information is copied from RAM to back-up storage. When the power is restored, the information is copied back to the RAM from the back-up storage, and the SSD resumes normal operation.

Being nascent in a market rejuvenated by green, virtualization, performance considerations, SSDs also find use in companion virtualization as a mutual enabler for mirroring memory and file/disk-state of systems. Hence, numerous opportunities to innovate arise, such as addressing disaster recovery ("DR") by enhanced means unique to the SSD environment. Usually, enterprise-class SSDs are SRAM-backed (e.g., by the SSD sold by Fusion-io™ under the tradname ioDrive Duo™) in turn backed by low-power/low-cost batteries (e.g., on-board rechargeable button cells on the SSD unit). Uses for such SSDs include as main memory with stable-store to back up against power-outages and for real-time backup of filesystems or highly dynamic system states and filesystems.

SUMMARY

These and other needs are addressed by the various embodiments and configurations of the present invention. The present invention is directed generally to the use of a solid-state drive in a virtualization environment to provide disaster recovery.

In a first embodiment, a process is provided that includes the steps:

(a) providing first, second, and third memory devices, wherein the first memory device comprises a first virtual machine and the a first virtual machine executes on a processor and wherein the second memory device is long term storage discrete from the first memory device and the third memory device is a solid-state drive discrete from the first and second memory devices;

(b) mirroring the filesystem, first memory, and/or network states of the first virtual machine in the second memory device; and (c) detecting at least one of (i) a power outage impacting the first and second memory devices and (ii) a disk failure impacting the second memory device; and (d) in response, performing one or more of the following sub-steps:

(D1) failing over the filesystem state, first system, and/or network states from the second memory device to the third memory device, thereby permitting the first virtual machine to continue running on the first memory device; and (D2) failing over the filesystem, first memory, and network states from the first and second memory devices to the third memory device, thereby causing the first virtual machine to terminate running on the first memory device and initiate running on the third memory device.

In one configuration, the first memory (volatile) and supporting processor system are backed by an Uninterruptible Power Supply ("UPS") source with limited period protection from primary power outage. This UPS is capable of taking over and delivering a main-power-outage signal without failing the processor system; and the processor system's software is capable of detecting this (for followup actions).

In one configuration, step (D2) involves a memory remapping step from current first memory device to third memory device immediately upon receipt of a power-outage signal (and ending well before UPS runs out).

In a second embodiment, a process is provided that includes the steps:

(a) providing first and second memory devices, wherein the second memory device comprises first and second virtual machines, the first and second virtual machines executing on a processor in communication with the first and second memory devices and wherein the second memory device is a solid-state drive discrete from the first memory device;

(b) executing the first and second virtual machines on the processor;

(c) storing filesystem and network states and output of the first and second virtual machines on the second memory device;

(d) detecting a power outage, the power outage affecting the processor and first memory device;

(e) in response to step (d) and to conserve backup power, determining that the first virtual machine, but not the second virtual machine, is to continue operation; and (f) terminating execution, by the processor, of the second virtual machine.

The present invention can provide a number of advantages depending on the particular configuration. Embodiments can allow a low-power mode of operation where non-essential and diskbound services can be minimized and the system used to survive prolonged power outages or disk outages by almost seamless (session- and call-preserving) failovers. Low-cost SSDs can increase the virtualization and high availability level while providing high-bandwidth system mirroring with non-explicit, virtual-environment failover by filesystem failover (not by migration). For example, the second embodiment is failover of one or more virtual machines by directly using RAM-mirror of SSD without a virtual machine failover/switch. The versatility of the system can permit one, in the event of known, scheduled switchovers, to elect to configure for full-service short-time switchovers versus a limited-service long-duration failover.

These and other advantages will be apparent from the disclosure of the invention(s) contained herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

The term "filesystem" is a method for storing and organizing computer files and the data they contain to make it easy to find and access them. File systems may use a computer readable medium and involve maintaining the physical location of the files.

The term "hypervisor" or virtual machine monitor refers to the software layer providing the virtualization. A hypervisor can run on bare hardware (a Type I or native virtual machine) or on top of an operating system (a Type II or hosted virtual machine).

The term "module" refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The term "page" refers to a section of memory that is accessible at one time.

The term "virtual machine" includes system virtual machines (or hardware virtual machines), which provide a complete system platform to support the execution of a complete operating system, and process virtual machines (or process virtual machines), which run a single program that supports a single process. System virtual machines allow the sharing of the underlying physical machine resources between differing virtual machines, each running on its own operating system. Process virtual machines run as a normal application inside on operating system, are created when the supported process is started, and destroyed when the process exists. A common characteristic of a virtual machine is that the software running inside is limited to the resources and abstractions provided by the virtual machine.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

The virtualization system disclosed herein extends the scope of SSD usage to provide operational continuity by leveraging the persistence of SSD storage in high availability and high availability-virtualization for short-duration (if not longer) failover/switchover. In the event of a disk failure or power outage, the SSD can provide persistent memory for virtual machines, whether operating on the main memory of the system or on the SSD itself, during the disk failure or power outage. The system can then failback to the main-system mode on power-restore or fallback to preserving state in SSD stable-store in the event of on-board battery or uninterruptible power supply ("UPS")-runouts for longer term power outages.

Figure 1:
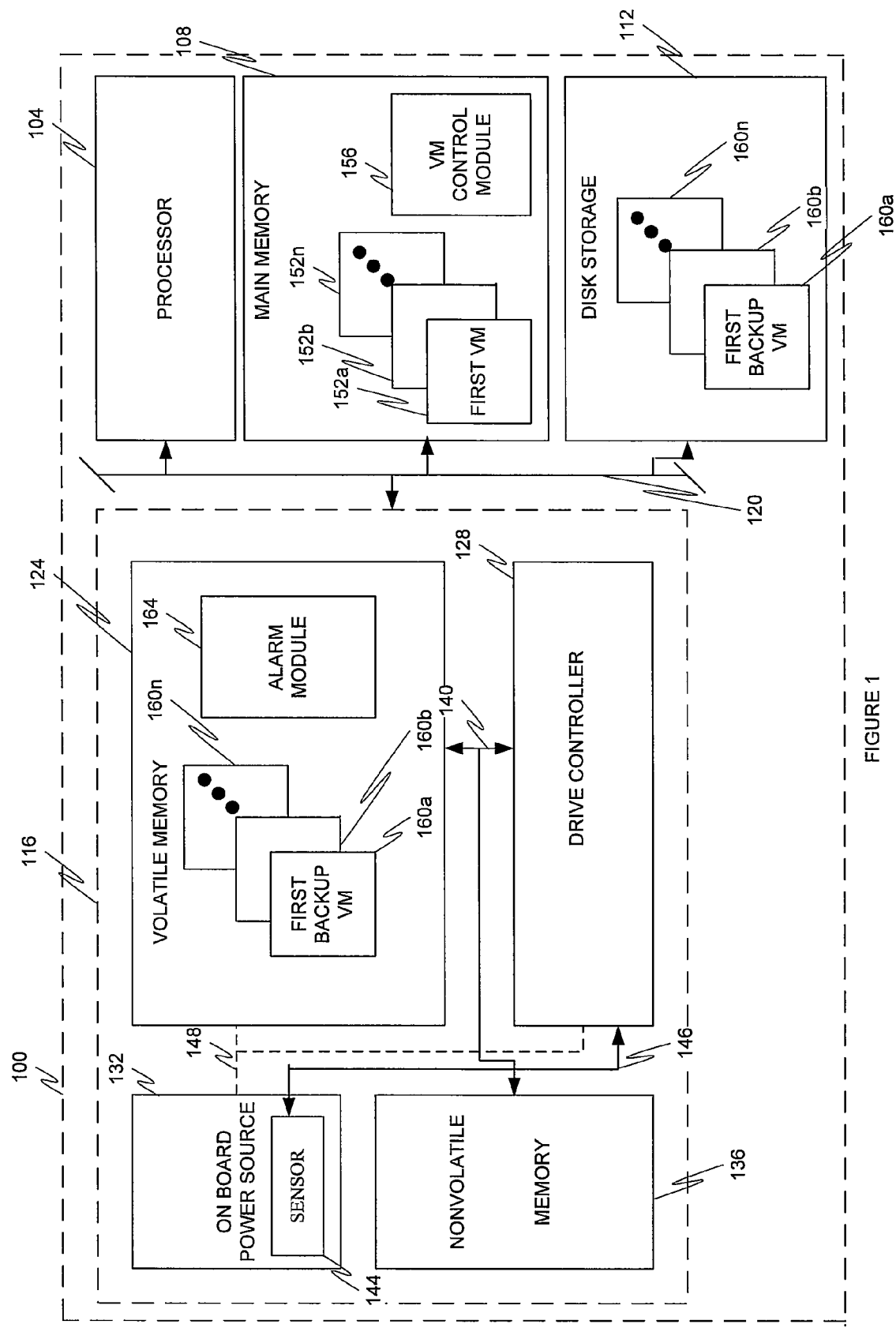
FIG. 1 is a block diagram depicting a virtualization system according to an embodiment.

FIG. 1 depicts a virtualization system 100 of a first embodiment. The system 100 includes a processor 104, such as a microprocessor, to execute a plurality of virtual machines, a main memory 108, disk storage 112, and an SSD 116, interconnected by signal carrier 120. Main memory 108 and disk storage 112 can be any suitable form of computer readable media. Typically, disk storage 112 is one or more of a floppy disk, a flexible disk, hard disk, magnetic tape, or any other magnetic medium, magneto-optical medium, a CD-ROM, any other optical medium, punch cards, paper tape, and any other physical medium with patterns of holes. The signal carrier 120 can be a bus, a local area network, a wide area network, or any other suitable type of carrier. In one configuration, the processor 104 and main memory 108 are collocated, such as in a server, and the disk storage 112 and/or SSD 116 is/are located remotely therefrom. Although a client-server network type is discussed, it is to be understood that a peer-to-peer network type may also be employed.

Although not shown in FIG. 1, the processor 104 and main memory 108 in the system has power (UPS) back-up, which has the ability to deliver a power outage notification signal to the system. The VM control module 156 detects and responds to the notification signal as discussed below.

The SSD 116 includes volatile memory 124, drive controller 128, on board power supply 132, and nonvolatile memory 136. The nonvolatile memory 136, volatile memory 124, and drive controller 128 are interconnected by signal carrier 140. An on board power source sensor 144 and signal carrier 146 provides to the drive controller 128 the remaining life of the on board power source. Power line 148 provides power from the on board power source 132 to the volatile memory 124 and drive controller 128. In one configuration, the SSD is an ioDrive Duo™ manufactured by Fusion-io™.

The drive controller 128 can be any device allowing the processor 104 to communicate with the volatile and nonvolatile memories 124 and 136.

The on board power source 132 can be any suitable on-board energy storage device, such as a rechargeable battery source (e.g., on-board rechargeable button cells on the SSD unit).

The volatile memory 124 and nonvolatile memory 136 can be any suitable type of computer readable media.

Main memory 108 includes first, second, . . . nth (active) virtual machines ("VMs") 152a-n and a VM control module 156. The VM control module 156, in one configuration, is a hypervisor. In one configuration, the VM control module 156 is domain or virtual machine zero in the virtual machine system in main memory 108. Apart from controlling VM operation, the control module 156 determines and implements a selected failover strategy as discussed below.

Disk storage 112 and volatile SSD memory 124 include first, second, . . . nth backup VMs. As used herein, a "backup VM" refers to one or more of mirrored (main) memory, network (session), and filesystem states attached to a corresponding virtual machine. Maintenance of the backup VMs can be done by many techniques.

In one technique implemented by a software system sold under the tradename Remus™, periodic "snapshots" of the filesystem, network (session), and VM output cache (in main memory 108) or main memory 108 states of a selected active virtual machine are replicated at relatively high frequencies. The technique uses four steps, namely checkpoint, transmit, synchronization, and release. In the checkpoint and transmit steps, execution of the virtual machine is paused, the state of the active virtual machine is copied, the copied active virtual machine state transmitted to external backup storage, particularly disk storage 112 and/or volatile memory 124, and the virtual machine resumes speculative execution, without waiting for acknowledgement from the backup storage. Once the complete set of state has been received, the checkpoint is acknowledged by external storage to the processor 104. In the release step, the buffered network output is released. Instead of letting the normal output stream dictate when synchronization must occur, VM output is buffered in main memory 108 until a more convenient time, performing computation speculatively ahead of synchronization points. Buffering VM output in the main memory 108 allows replication to be performed asynchronously. On the external backup storage, the virtual machine image can begin execution immediately if failure of an active system is detected. Because the backup is only periodically consistent with the active virtual machine, all network output is buffered in main memory 108 until state is synchronized on the backup storage.

In another technique implemented by a software system sold by Paragon Software Group™ under the tradename Snapshot™, a file system writes selected first data blocks to a computer readable medium, marking them with pointers. A snapshot is taken (e.g., of the filesystem, network, and VM output cache states of the active first, second, . . . nth virtual machines 152a-n), without any data being read, written or copied to the computer readable medium. The snapshot simply points to the current locations. In one variation, the file system modifies a selected one of the first data blocks and writes, in the selected block, second data to the computer readable medium. At first, the selected first data block is copied to a new location and only then the original, selected first data block is changed to the second data. The file system still points to the same locations. In another variation, the file system writes second data to the computer readable medium, without changing the selected first data block. The file system points to the second data, instead of the selected first data block, while the snapshot still points to the selected first data block, which is unchanged.

As will be appreciated, other mirroring techniques can be used, such as the techniques used by Double-Take™ from Double-Take™ Software.

Volatile memory 124 further includes an alarm module 164 to determine when a disk storage malfunction or power outage has occurred. This is typically in response to an alarm or interrupt from the VM controller 156. As noted, this signal is received from the UPS (not shown).

Figure 2:
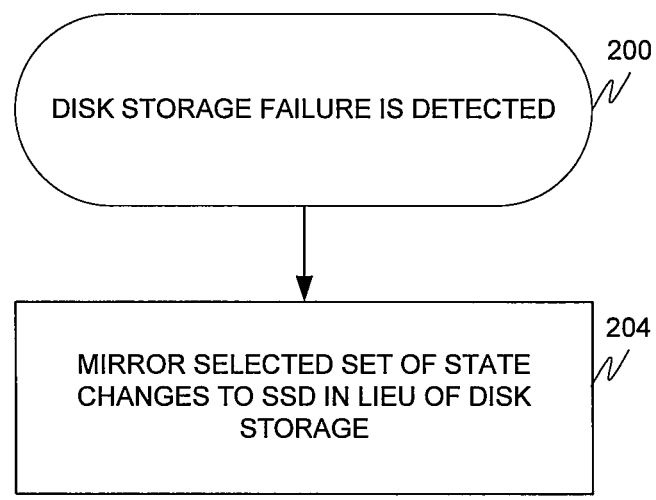
FIG. 2 is a flow chart according to an embodiment.

The operation of the virtualization system 100 according to an embodiment will now be discussed with reference to FIG. 2. The embodiment assumes that mirroring of active first, second, . . . nth virtual machine 152a-n operation is being performed in disk storage 112.

In step 200, disk storage 112 failure is detected by the VM control module 156, and an alarm or interrupt is sent to the alarm module 164. The VM control module 156 is notified of the failure typically by an error message received in response to a read or write command.

In response, the alarm module 164 notifies the disk controller 128, which, together with the VM control module 156, implements a predetermined disaster recovery operation, which is to mirror a selected set of VM state changes to SSD 116 in lieu of disk storage 112. In this embodiment and as shown by the first, second, . . . nth backup VMs 160a-n in the volatile memory 124, a filesystem failover to SSD 116 is done to permit continued active first, second, . . . nth virtual machine 152a-n operation. In other words, data storage pointers or references to the main memory 108 for a selected active VM are maintained for the selected VM but data storage pointers to volatile memory 124, different from those formerly used to refer to disk storage 112, are used to refer to the virtual machine state information formerly mirrored by disk storage 112. Mirroring is then continued in the volatile memory 124 using, for example, one of the techniques discussed above. As will be appreciated, mirroring by the volatile memory 124 may be done in parallel with mirroring by the disk storage 112 or, alternatively, by the volatile memory 124 only after disk storage 112 failure. As will be further appreciated, mirroring of the first, second, . . . nth backup VMs 160a-n in volatile memory 124 may simultaneously be performed in nonvolatile memory 136. By this embodiment, a new (different) active virtual machine in different memory does not take over but the same active virtual machine in main memory continues operation. For a selected active VM 160, there is thus no switch over from one particular active VM instance to another (different) VM instance.

Figure 3:
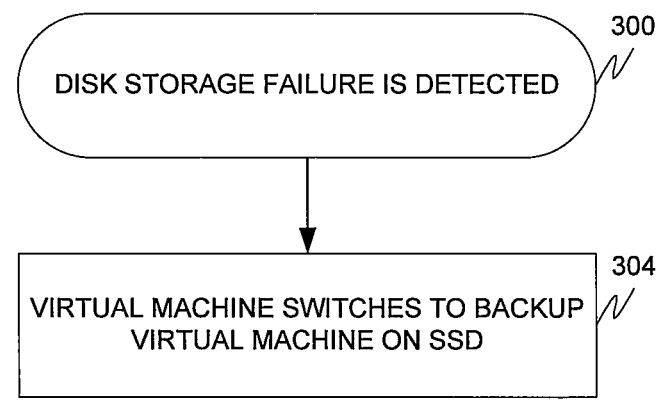
FIG. 3 is a flowchart according to an embodiment.

The operation of the virtualization system 100 according to another embodiment will now be discussed with reference to FIGS. 1, 3, and 4. Compared to the prior embodiment, this embodiment not only switches over filesystem references (or performs a failover to SSD 116 volatile memory 124 from disk storage 112) VM but also performs a memory failover from main memory 108 to SSD 116 volatile memory 124. Stated another way, the active first, second, . . . nth VMs 152a-n are mapped directly to the volatile memory 124 of the SSD 116. In the event of a disk storage 112 failure, an active VM failover can be triggered to run a main instance (or the active VM) by having the main memory 108 switch to SSD 116 memory-mirror while having the main memory 108 stop running the active VM.

In step 300, disk storage 112 failure is detected. Prior to disk storage 112 failure, the virtualization system configuration is depicted in FIG. 1, with the active first, second, . . . nth VMs 152a-n in main memory 108 and backup first, second, . . . nth VMs 160a-n in disk storage 112 and optionally in volatile memory 124.

Figure 4:
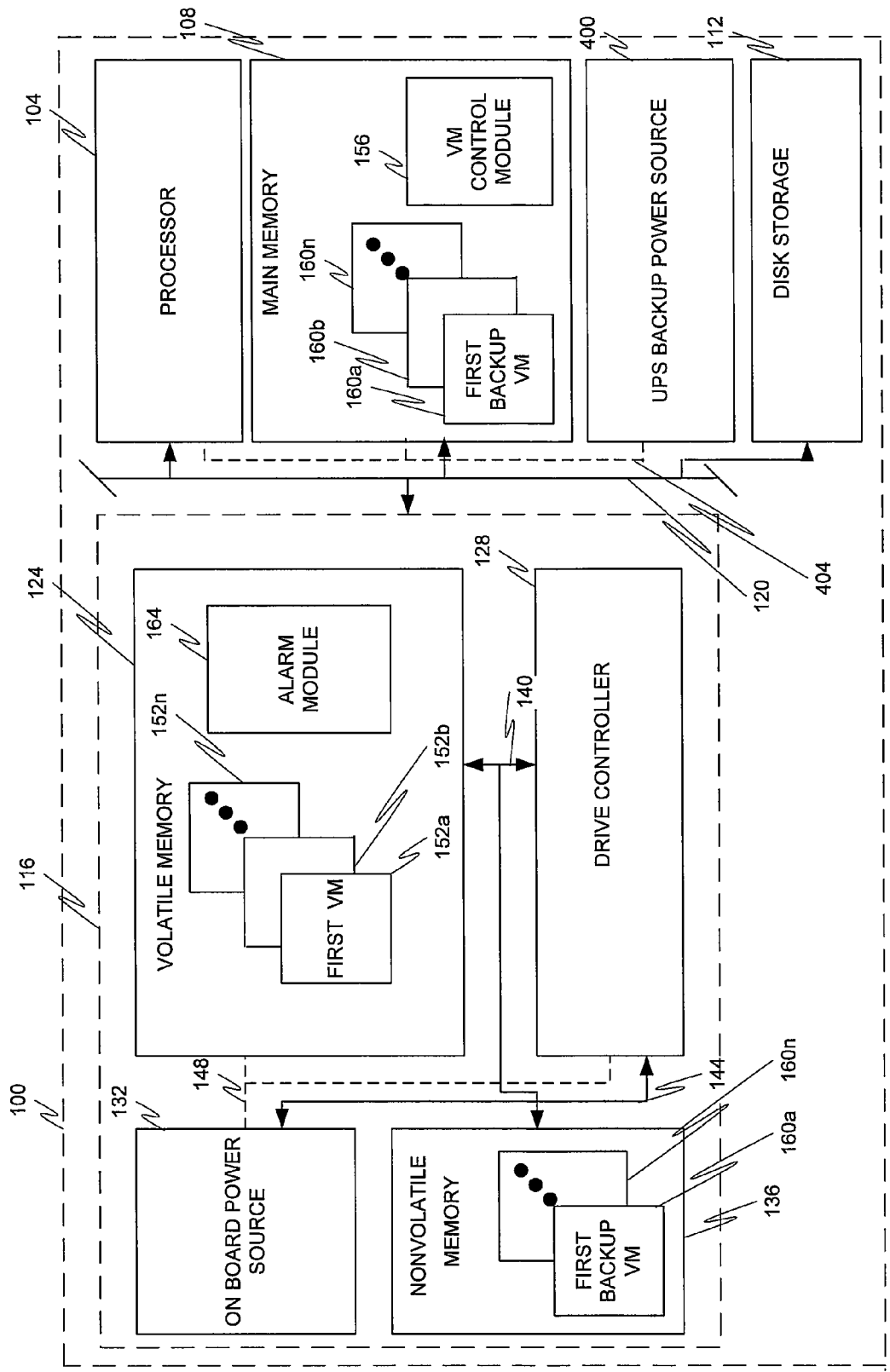
FIG. 4 is a block diagram depicting a virtualization system according to an embodiment.

In step 304 and as shown by FIG. 4, the first, second, . . . nth active virtual machines 152a-n are switched to run on SSD 116 rather than main memory 108. Stated another way, all references or pointers for each of the active VMs 152a-n are switched from the main memory 108 and disk storage 112 to the driver mechanism of SSD 116. This is done by parsing each of the active virtual machines 160a-n, remapping the physical pages of each of the active virtual machines 160a-n to the physical pages of the mirrored volatile memory 124 of the SSD 116, and, thereafter, restarting, on the volatile memory 124, operation of each of the active virtual machines 160a-n. In other words, a complete switch has been made from main memory 108 and disk storage 112 to the volatile memory 124 in the SSD 116. The volatile memory 124 of the SSD 116 is relied upon (or referenced) both for the check pointed memory, network, and filesystem states. As will be further appreciated, mirroring of the first, second, . . . nth active VMs 152a-n in volatile memory 124 may simultaneously be performed in nonvolatile memory 136. In one configuration shown by FIG. 4, the main memory 108 is now used for the VM mirroring operation.

The operation of the virtualization system 100 according to another embodiment will now be discussed with reference to FIGS. 4 and 5. Compared to the prior embodiments, this embodiment directly maps filesystem references for the active first, second, . . . nth VMs 152a-n to SSD 116 volatile memory 124 and mirrors the first, second, . . . nth backup VMs 160a-n on nonvolatile memory 136. In this embodiment because the volatile memory 124 of the SSD 116 is used as the primary memory for the processor 104, the complexities of switching or failing over from one computer readable medium to another are avoided. Main memory 108 is used only optionally for virtual machine operations. Running of the first, second, . . . nth VMs 152a-n occurs entirely on the volatile memory 124 of the SSD 116. Prior to discussing this embodiment, it is important to note that FIG. 4 includes a UPS backup power source 400 for providing backup power, via line 404 and in the event of power failure, to the processor 104 and main memory 108.

This embodiment can provide for power outage survivability.

Figure 5:
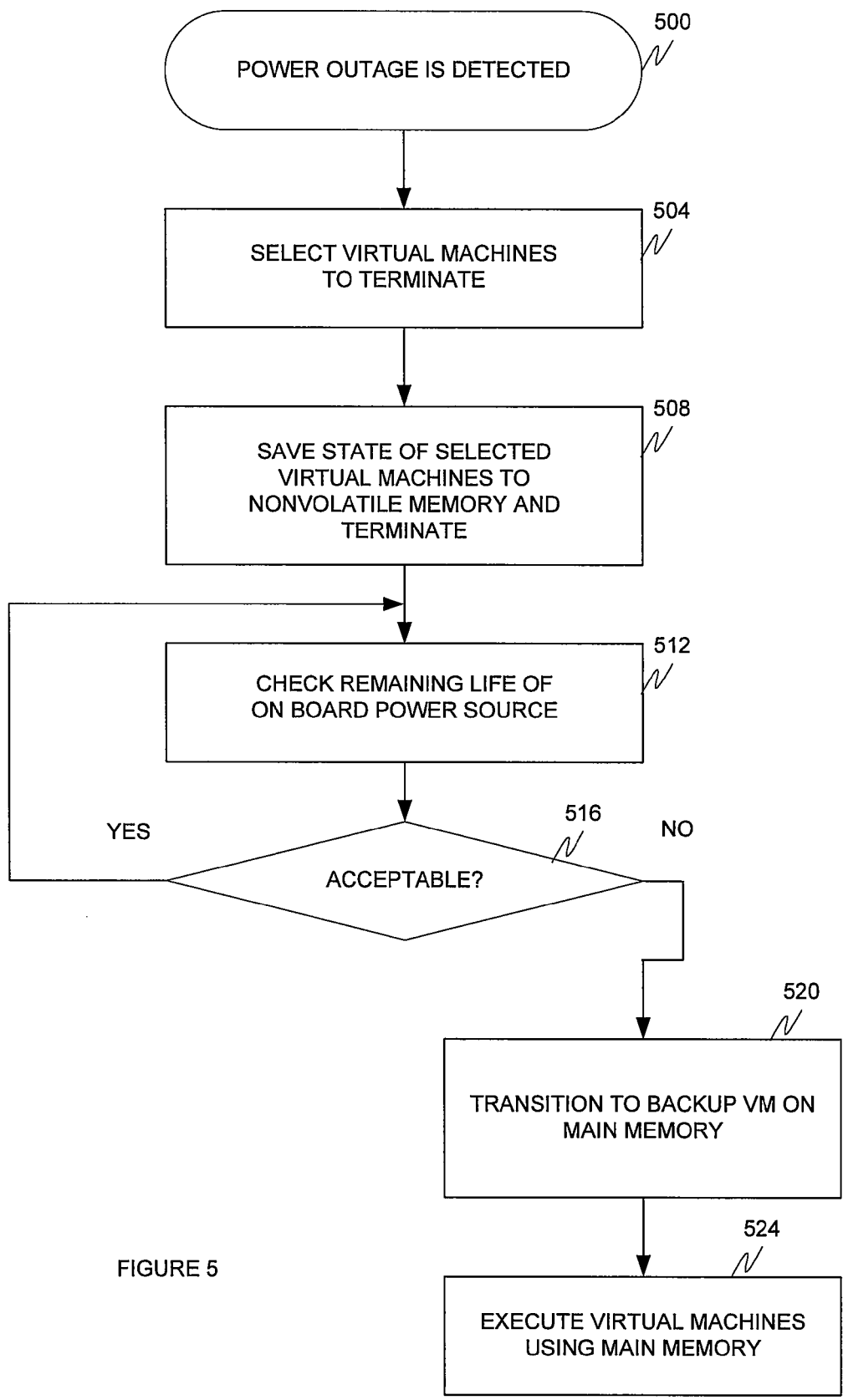
FIG. 5 is a flow chart according to an embodiment.

With reference to FIG. 5, a power outage is detected in step 500. This power outage can be not only for the processor 104 and main memory 108 but also for the SSD 116. As a result of the outage, the processor 104, main memory 108, and SSD 116 are operating on temporary power sources. In the case of the SSD 116, the temporary power source is on board power source 132, and, in the case of the processor 104 and main memory 108, the temporary power source is the UPS backup power source 400.

In step 504, the VM control module 156 selects which of the first, second, . . . nth VMs 152a-n shall continue operation and which shall discontinue operation. This is done to reduce power consumption by main memory 108, processor 104, and SSD 116 while providing higher processing speeds. Factors used in making these VM selections include the criticality of a selected VM for system operation (which depends, of course, on what kinds of virtual machines and virtual machine functionalities are running), the amount of memory to be used to run each of the VMs (or energy consumption by each VM), the amount of processing power needed to execute each of the VMs, and whether or not a VM needs to be run in real time or can tolerate latency (disk storage management can tolerate latency and can therefore run in the slower nonvolatile memory 136 as opposed to the faster volatile memory 124).

In step 508, the state of the selected virtual machines is saved to nonvolatile memory 136 and their operations terminated. The virtual machines that are to continue operation meanwhile are run on the volatile memory 124.

In step 512, the on board power source sensor 144 determines the remaining life of the on board power source 132.

In decision diamond 516, the disk controller 128 determines whether the remaining life is sufficient for continued operation. If so, the process returns to and repeats step 512 at a suitable interval or, alternatively, returns to and repeats 504 to determine if additional virtual machines should be terminated. If the remaining life is not sufficient, the process continues to step 520.

In step 520, the disk controller 128, in one configuration, transitions to backup VMs 160a-n in main memory 108. In another configuration, the first, second, . . . nth VMs 152a-n are mirrored on nonvolatile memory 136 and execution of all VMs terminated.

In step 524, in the former configuration the backup VMs 152a-n on main memory 108 begin execution. If the on board power source 132 of the SSD 116 recharges to a predetermined level, execution of the VMs can be transitioned again to volatile memory 124 for continued operation.

As will be appreciated, the failback and switchback scenarios are reciprocal to the failover and switchover scenarios discussed above.

As will be further appreciated, the failover and switchover scenarios can be applied to the main memory 108 when the main memory 108 experiences a power outage and continues to store the first, second, . . . nth VMs 152a-n.

The exemplary systems and methods of this invention have been described in relation to a system having a processor interconnected with local and remote storage devices. However, to avoid unnecessarily obscuring the present invention, the preceding description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a computer, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

For example in one alternative embodiment, the first, second, . . . nth VMs 152a-n are mapped directly to nonvolatile memory 136, while optionally using the main memory 108, and falling back, or mirroring the first, second, . . . nth backup VMs 160a-n on the volatile memory 124 of the SSD 116. In other words, the first, second, . . . nth VMs 152a-n run on the nonvolatile memory 136.

In yet another embodiment, the systems and methods of this invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A process, comprising:
providing first, second, and third memory devices, wherein the first memory device comprises at least a first virtual machine and the at least a first virtual machine executes on a processor in communication with the first memory device, the second memory device, and the third memory device, and wherein the second memory device is long term storage discrete from the first memory device and the third memory device is a solid-state drive discrete from the first and second memory devices;
mirroring at least one of filesystem, first memory, and network states of the at least a first virtual machine in the second memory device;
detecting a disk failure impacting the second memory device; and
in response to detecting the disk failure of the second memory device:
switching references and pointers for the at least a first virtual machine from the first and second memory devices to volatile memory in the third memory device;
running an instance of the at least a first virtual machine on the third memory device and terminating running the at least a first virtual machine on the first memory device;
detecting a power outage for the third memory device;
in response to detecting the power outage for the third memory device and to conserve backup power, determining that the instance of the first virtual machine, but not a second virtual machine, is to continue operation; and
terminating execution of the second virtual machine by the processor.

2. The process of claim 1, wherein the first memory device is in a server, wherein the second memory device is dislocated from the first memory device, wherein the first and second memory devices are in communication via a network, and wherein the second memory device is disk storage and further comprising of a limited period uninterruptible Power Supply ("UPS") with a power-outage notification/detection capability.

3. The process of claim 1, wherein the switching comprises:
parsing the at least a first virtual machine to provide physical pages of the at least a first virtual machine in the first memory device;
remapping the physical pages in the first memory device to physical pages in the third memory device; and
thereafter restarting, on the third memory device, operation of the at least a first virtual machine.

4. A tangible, non-transitory computer readable medium comprising processor executable instructions that, when executed by the processor, perform the steps of claim 1.

5. A machine, comprising:
first, second, and third memory devices, wherein the first memory device comprises at least a first virtual machine and wherein the second memory device is long term storage discrete from the first memory device and the third memory device is a solid-state drive discrete from the first and second memory devices; and
a processor, operable to:
execute the at least a first virtual machine,
mirror at least one of filesystem, first memory, and network states of the at least a first virtual machine in the second memory device;
detect a disk failure impacting the second memory device; and
switching references and pointers for the at least a first virtual machine from the first memory device and the second memory device to volatile memory in the third memory device, in response to detecting the disk failure of the second memory device;
using data storage pointers to volatile memory in the solid-state drive for machine state information of the at least a first virtual machine formerly mirrored by the second memory device to continue running the at least a first virtual machine on the first memory device;
wherein the processor is further operable to detect a power outage impacting at least the third memory device and in response to detecting the power outage and to conserve backup power, determine that the first virtual machine, but not a second virtual machine, is to continue operation; and
in response to determining that the second virtual machine is not to continue operation, terminate execution of the second virtual machine by the processor.

6. The machine of claim 5, wherein the first memory device is in a server, wherein the second memory device is dislocated from the first memory device, wherein the first and second memory devices are in communication via a network, and wherein the second memory device is disk storage.

7. The machine of claim 5, wherein in response to the disk failure:
parsing the at least a first virtual machine to provide physical pages of the at least a first virtual machine in the first memory device;
remapping the physical pages in the first memory device to physical pages in the third memory device; and
thereafter restarting, on the third memory device, operation of the at least a first virtual machine.

8. The machine of claim 7, wherein, while the at least a first virtual machine runs on the third memory device, the processor mirrors, on the first memory device, at least one of filesystem, first memory, and network states of the at least a first virtual machine.

9. The machine of claim 7, wherein the third memory device comprises volatile and nonvolatile memory and wherein, while the at least a first virtual machine runs on volatile memory of the third memory device, the processor mirrors, on nonvolatile memory of the third memory device, at least one of filesystem, first memory, and network states of the at least a first virtual machine.

* * * * *